No. 775,238. PATENTED NOV. 15, 1904.
W. S. COLWELL.
COOLER.
APPLICATION FILED JUNE 17, 1904.
NO MODEL. 3 SHEETS—SHEET 1.
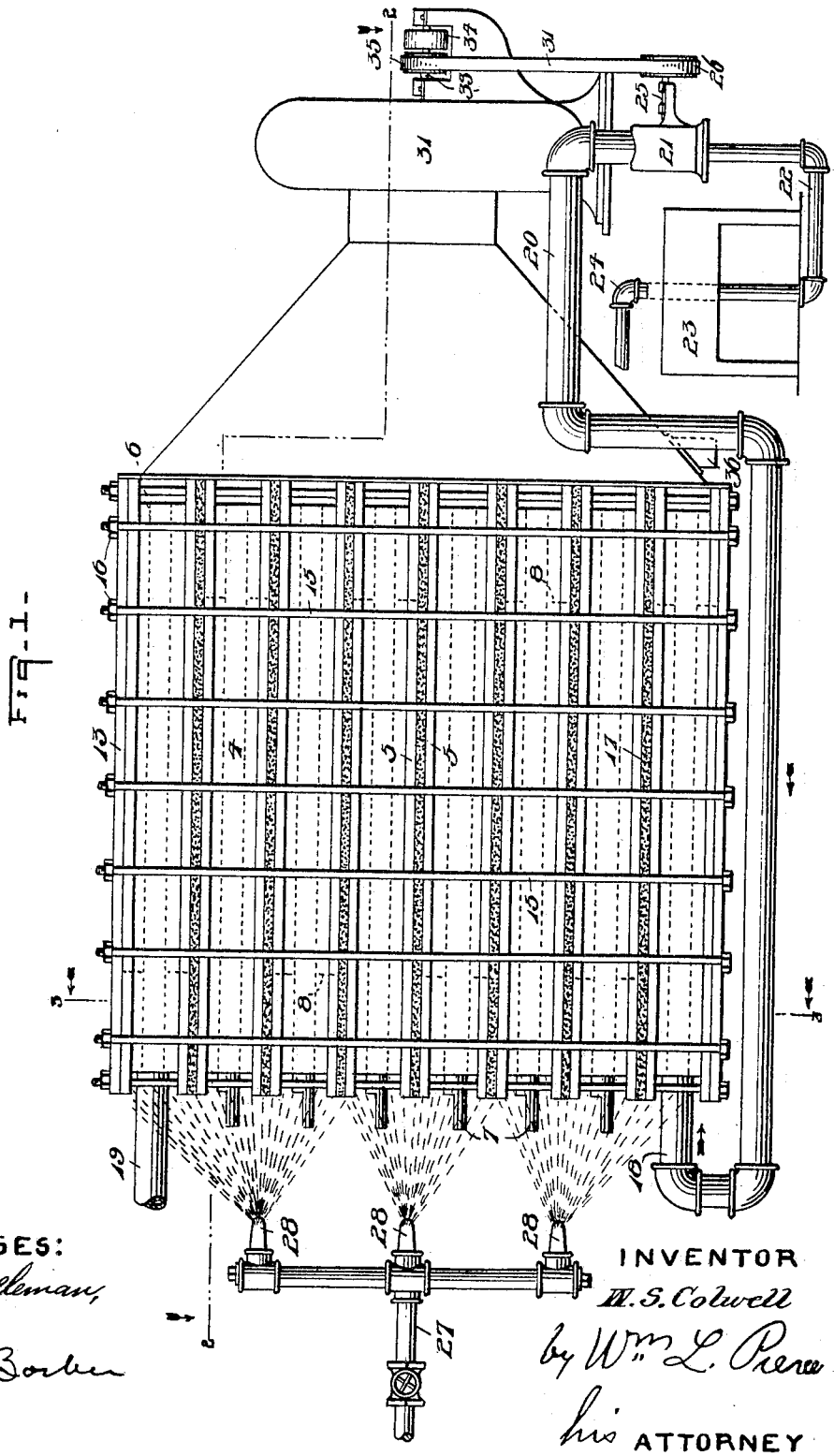
WITNESSES:
INVENTOR
W. S. Colwell
his ATTORNEY

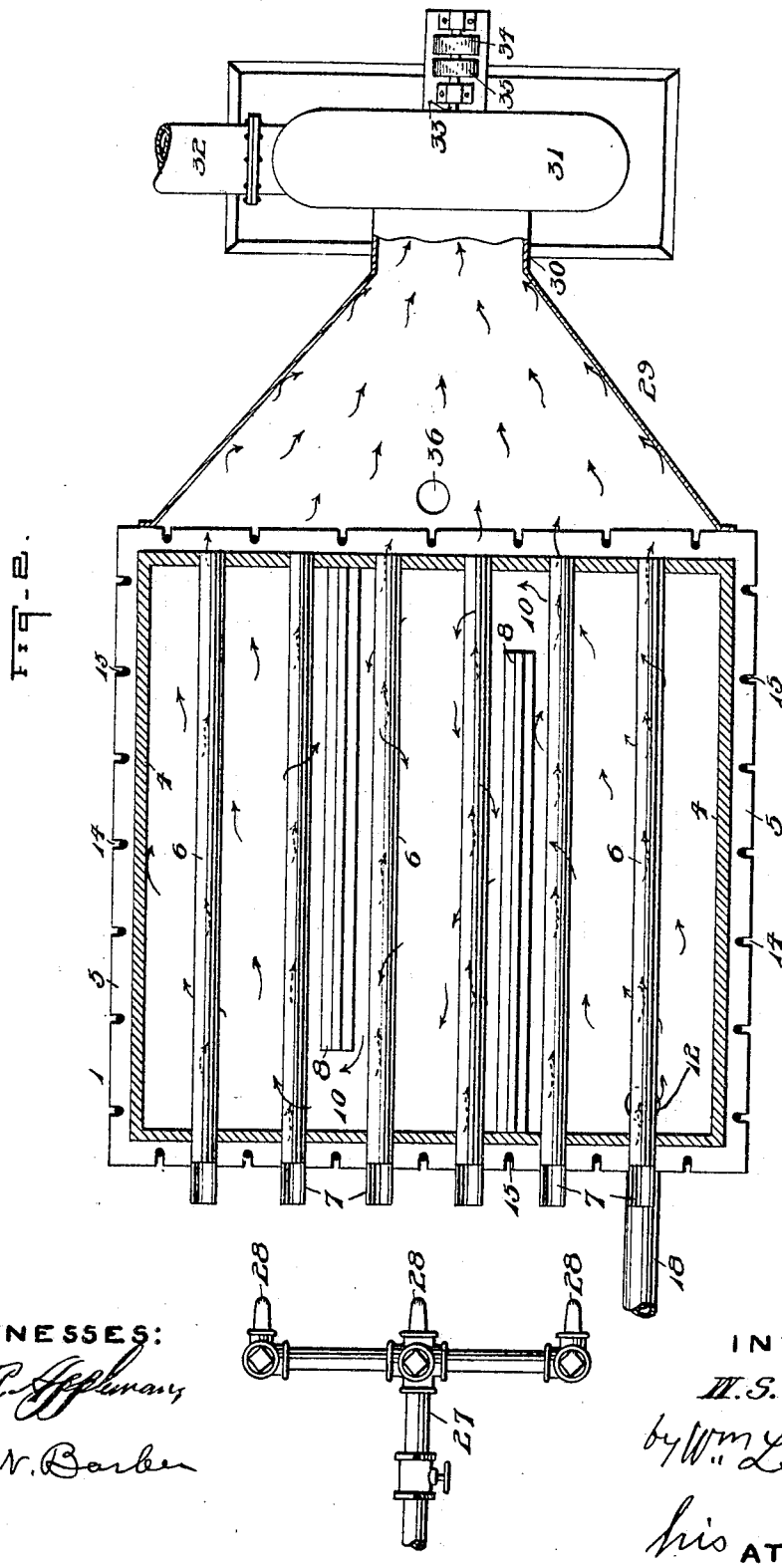

No. 775,238. PATENTED NOV. 15, 1904.
W. S. COLWELL.
COOLER.
APPLICATION FILED JUNE 17, 1904.
NO MODEL. 3 SHEETS—SHEET 3.
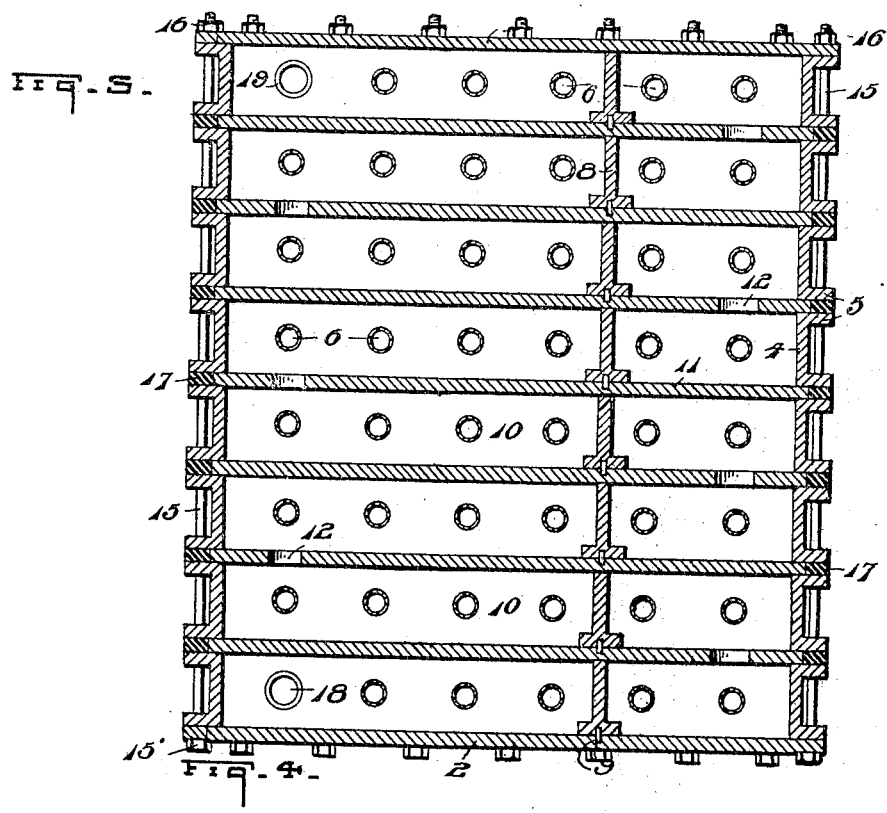
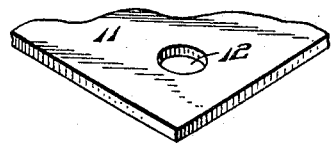
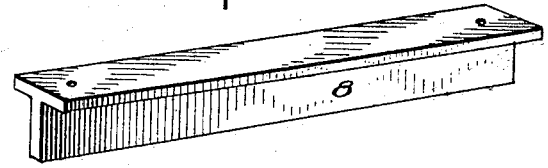
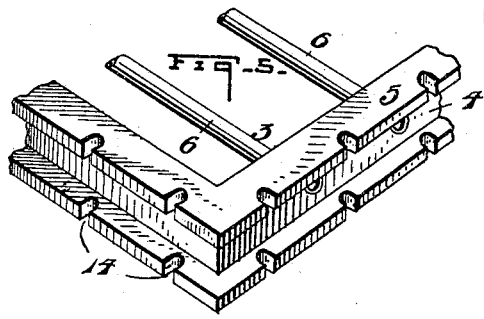
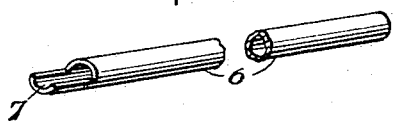
WITNESSES:
INVENTOR
W. S. Colwell
by Wm L. Pierce
his ATTORNEY No. 775,238. Patented November 15, 1904.

UNITED STATES PATENT OFFICE.

WILLIAM S. COLWELL, OF PITTSBURG, PENNSYLVANIA.

COOLER.

SPECIFICATION forming part of Letters Patent No. 775,238, dated November 15, 1904.

Application filed June 17, 1904. Serial No. 212,968. (No model.)

*To all whom it may concern:*

Be it known that I, WILLIAM S. COLWELL, a citizen of the United States, residing at Pittsburg, in the county of Allegheny and State of Pennsylvania, have invented or discovered new and useful Improvements in Coolers, of which the following is a specification.

My invention relates to a cooler or apparatus for reducing the temperature of gases or liquids.

With the coolers commonly in use it has not been possible to cool liquids at 212° Fahrenheit down to less than 60° Fahrenheit or 90° Fahrenheit. I have found that the cooling fluid should preferably be in a liquid state and not in a vapor or gaseous state and that the same should be subjected to the influence of moving air under suction or rarefaction rather than under pressure or condensation. It is known that the change from a liquid to vapor or gas is accompanied by an absorption of a large amount of heat, and for this reason the cooling fluid should not be in a state of maximum expansion, but on the verge of expansion, which is much promoted by having the liquid in a finely-divided state, as fine streams or fine drops, preferably the the latter. The rapid transformation of the cooling liquid into vapor or gas is hastened by producing conditions allowing the freest possible expansion of the liquid. I therefore exhaust or suck the air through or in contact with the cooling-surfaces in contact with the liquid instead of forcing it, as the compression of the air produces heat rather than an absorption thereof.

In the drawings which form a part hereof, Figure 1 is a side elevation of the selected form of my apparatus by which my improved method of cooling may be practiced; Fig. 2, a horizontal section in the line 2 2 of Fig. 1, the partitions 8 being shown in plan; Fig. 3, a vertical section on the line 3 3 of Fig. 1; Fig. 4, a detail in perspective of one of the horizontal plates which divides my cooler in layers; Fig. 5, a detail in perspective of one of the frames which form the sides of the layers of my cooler; Fig. 6, an inverted perspective of one of the T-irons which divide the layers into sinuous passages; and Fig. 7, a perspective, partly broken away, of one of the tubes for carrying the cooling medium.

My cooler is made up of a vertical series of horizontal sections, each having a floor or bottom, a roof or top, an inclosing frame between each floor and roof, and partitions to cause a sinuous flow of fluid. A number of these sections secured together constitute the cooler proper, (designated by the numeral 1.) The bottom thereof consists of a plate 2 of iron of the desired length and breadth. On this plate is placed the open frame 3, which consists of a channel-iron having the web 4 and outwardly-extending flanges 5. Preferably the channel-iron is a continuous piece of iron properly bent and welded.

Extending through and fitting tightly in two opposite webs of the frame are a series of open-ended tubes 6. The rear ends of the tubes may be flush with the outer face of the web 4; but I prefer to extend the opposite ends of the tubes forwardly and remove the upper halves of the extensions designated by the numeral 7. In Fig. 2 I have shown six tubes 6, divided into three groups of two each by the partitions 8, preferably of T-iron, the heads of the T-irons lying on the bottom 2, to which it is held immovable by dowel-pins 9 in registering holes in the bottom and partitions. The partitions do not extend entirely from one side to the other of the frame 3, but each has one end against the frame and the other end separated from the opposite side of the frame by the space 10. The spaces are arranged so as come alternately at opposite sides of the frame, thereby forming a zigzag or sinuous passage from one side of the section to the other, as shown by the arrows on Fig. 2.

On top of the frame 3 and partitions 8 is placed the horizontal plate or partition 11, which constitutes the top of the section just described and the bottom of the next higher section. The latter section is constructed the same as the lowest section, though the groups of tubes may vary, if desired. The partition 11 has near one corner an opening 12, which communicates with the interior of the lowest section near the end of the circulation therefor. The circulation takes a sinuous course in the second section in a direction opposite that in the first section and communicates with the third section by means of the hole 12 in the partition 11, constituting the top of the second section and the bottom of the third section. The top section is covered with the top plate 13, which, together with the bottom 2 and the several flanges 5, are provided with slots 14 to receive the vertical tie-rods, having the heads 15' beneath the plate 2 and nuts 16 on the plate 13. The partitions 11 do not extend out so far as the flanges 5, and the spaces between the flanges and the edges of the partitions are provided with packing 17 of any selected kind, which is clamped between the flanges by means of the nuts 16 so tightly that the fluid in the sections cannot escape.

As many horizontal sections may be superposed as desired, the several sections being constructed in the same manner. The zigzag or sinuous course in the several sections and from one section to another is taken by the liquid or gas to be cooled, which enters by the inlet-pipe 18 and flows out through the outlet-pipe 19.

20 represents a pipe leading from the rotary pump 21 to the inlet-pipe 18. The pump is connected by the pipe 22 to the tank 23, into which water from a condenser or other source falls from the pipe 24. In case the fluid in the pipe 23 should be condensed ammonia the pipes 22 and 24 would be continuous, as shown by dotted lines, and the tank 23 might be omitted. The shaft 25 of the pump has a pulley 26.

At the forward end of the cooler 1 is a pipe 27, feeding several nozzles 28, which throw a cooling fluid, as water, in fine jets or drops against the cooler-front. The rear end of the cooler 1 is provided with an inclosing hood 29, which tapers into the tube 30, leading to the exhaust-fan chamber 31, provided with an outlet-pipe 32.

The fan-shaft 33 is provided with pulleys 34 and 35, the former for connection to a source of power and the latter for connection to the pulley 26.

The nozzles 28 should not preferably turn the water into fine vapor or mist, but retain the water in its true fluid state, so that under the action of the exhaust-fan it may be converted into vapor. Preferably water will run in small streams in the tubes 6, so that it may be evaporated along the whole length thereof. The extensions 7 of the tubes are troughs to catch and convey more of the water into the tubes. It will be seen that as the fan draws the air through the tubes 6 it will catch up the water and convert it into spray by the aid of the heat absorbed from the fluid running in contact with the outside of the tubes. Under the action of the expanding evaporating moisture heat will be absorbed quickly, and the heated air will then pass out of contact with the cooling-pipes. The pipes 6 are comparatively short, so that the rear ends of the tubes are not subjected to hot air, as in apparatus where the cooling fluid all travels over a series of hot tubes. In the latter case the tubes last to be reached by the cooling fluid are almost as hot as the fluid to be cooled.

The fluid to be cooled enters the lowest section of the cooler 1 and has a sinuous course through it and then up in the next section, where it takes another sinuous course, and so on up to the top section. The cooling fluid attacks all portions of the fluid to be cooled equally and does this by absorbing heat at many points and by the rapid travel by suction for short distances through the fluid to be cooled. The pump 21 forces the fluid to be cooled in a steady stream through the several sections of the cooler 1 while the apparatus is in action. The water which passes through the tubes 6 may be drained off through the pipe 36 in the bottom of the hood 29.

While I have described my cooling apparatus in detail, I do not desire to be restricted to each part as shown, but claim protection on all fair equivalents thereof. The sections may be variously constructed and have various shapes and contain any number of tubes 6, divided in desired groups, and various other changes may be made without departing from my invention. I find that the best results are secured by the use of twenty compartments, each divided by partitions 8 into passages containing four tubes an inch in diameter; but it is clear that any number of compartments, passages, and groups of tubes may be used.

Having described my invention, I claim—

1. In a cooler for fluids, a plurality of sections each having a shell, a series of tubes passing therethrough and secured therein, and a division-plate in the shell to cause a sinuous passage therein, in combination with means for causing a cooling liquid to enter said tubes in a state of fine subdivision, and means for causing the said liquid to pass through said tubes and expand in so passing.

2. In a cooler for fluids, a plurality of sections each having a shell, a series of tubes passing therethrough and secured therein, a division-plate in the shell extending in the direction of the tubes to cause a sinuous passage therein, and perforated division-plates between the several sections, whereby the sinuous passages of the sections are made continuous.

3. In a cooler for fluids, a plurality of sections, each having an open-ended frame, a series of tubular passages extending through the sides thereof, and one or more division-plates therein separating the tubes into groups, and causing a sinuous passage in the frame.

4. In a cooler for fluids, a plurality of sections, each having an open-ended frame, a series of tubular passages extending through the sides thereof, one or more division-plates therein separating the tubes into groups, and causing a sinuous passage in the frame, covers for the ends of the extreme sections, and perforated partitions between the sections, the perforations arranged so as to cause the fluid to be cooled to pass through the sinuous passages of the several sections, and inlet and outlet pipes for the extreme sections.

5. In a cooler for fluids, a plurality of sections, each composed of a frame of U-shaped metal, partitions between the frames, packing at the edges of the partitions and between the flanges of adjacent sections, cover-plates for the extreme sections, and means for securing the whole together.

6. In a cooler for fluids, a casing to contain the fluid to be cooled, a series of pipes extending through the casing and the fluid, means for directing a cooling liquid into the tubes, and trough-like extensions on said tubes directed toward the said means, in combination with means for directing a cooling liquid into said tubes and means for causing the said liquid to pass through said tube and expand in so passing.

7. In a cooler, a series of superposed compartments, partitions in the compartments arranged to form tortuous passages, each compartment communicating with the next compartment above it so as to connect the tortuous passages serially, an inlet for the lowest compartment, and an outlet for the highest compartment, open-ended tubes passing through and secured in the sides of the several compartments and extending in the direction of said partitions, means for throwing a cooling liquid in a state of fine subdivision into said tubes, and means for sucking said liquid mingled with air through the same.

Signed at Pittsburg this 13th day of June, 1904.

WILLIAM S. COLWELL.

Witnesses:
F. N. BARBER,
A. M. STEEN.